(12) United States Patent  (10) Patent No.: US 7,813,376 B1
Gibbons et al.  (45) Date of Patent: Oct. 12, 2010

(54) TERMINATION OF NETWORK CONNECTIONS IN ABSENCE OF A DYNAMIC NETWORK INTERFACE

(75) Inventors: John Gibbons, Ashland, MA (US); Paul Howard, Windham, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 465 days.

(21) Appl. No.: 11/760,446

(22) Filed: Jun. 8, 2007

Related U.S. Application Data

(60) Provisional application No. 60/938,916, filed on May 18, 2007.

(51) Int. Cl.
 *H04J 3/22* (2006.01)
(52) U.S. Cl. .................................. 370/469; 370/474
(58) Field of Classification Search ................. 370/469
 See application file for complete search history.

(56) References Cited

U.S. PATENT DOCUMENTS

2002/0167909 A1* 11/2002 Balazinski et al. .......... 370/252

2007/0195780 A1* 8/2007 Cabeca et al. ............... 370/392

OTHER PUBLICATIONS

D. Grossman et al., "Multiprotocol Encapsulation over ATM Adaptation Layer 5," RFC 2684, The Internet Society, Sep. 1999, 20 pgs.*
U.S. Appl. No. 11/402,145, filed Apr. 11, 2006, entitled "Dynamic Building of VLAN Interfaces Based on Subscriber Information Strings," by Cabeca et al.
U.S. Appl. No. 11/540,923, filed Sep. 29, 2006, entitled "Forwarding Traffic to VLAN Interfaces Built Based on Subscriber Information Strings," by Vinokour et al.
D. Grossman et al., "Multiprotocol Encapsulation over ATM Adaption Layer 5," RFC 2684, The Internet Society, Sep. 1999, 20 pgs.

* cited by examiner

*Primary Examiner*—Huy D Vu
*Assistant Examiner*—Michael J Digiovanni
(74) *Attorney, Agent, or Firm*—Shumaker & Sieffert, P.A.

(57) ABSTRACT

A network access device is described that uses a modified lower layer two (L2) software interface that is enhanced to operate as a proxy for a dynamic upper L2 software interface when the upper L2 software interface has been torn down, i.e., terminated unbeknownst to a subscriber device. The lower L2 software interface may, for example, be extended to incorporate certain features of the upper L2 software interface to detect such a condition. In the absence of the upper L2 software interface, the lower L2 interface may output a simulated termination request on behalf of the upper L2 interface and in accordance with the upper L2 protocol.

24 Claims, 9 Drawing Sheets

TERMINATION OF NETWORK CONNECTIONS IN ABSENCE OF A DYNAMIC NETWORK INTERFACE

This application claims the benefit of U.S. Provisional Application No. 60/938,916, filed May 18, 2007, the entire content of which is incorporated herein by reference.

TECHNICAL FIELD

The invention relates to computer networks, and more particularly to communications with a computer network.

BACKGROUND

Customer networks are networks established by individuals or companies for internal communication. Customer networks may include local area networks (LAN) or wide area networks (WAN) that comprise a plurality of subscriber devices, such as personal computers, laptops, workstations, personal digital assistants (PDAs), wireless devices, network-ready appliances, file servers, print servers, or other devices. The customer networks may meet customer-specific needs using a number of different communication protocols, such as Asynchronous Transfer Mode (ATM) protocol, Ethernet protocol, Bridged Ethernet protocol, frame relay protocols, or other communication protocols. ATM and frame relay protocols, for example, are frequently used for transport of audio, video, and computer data between source and destination devices within a customer network. Such protocols may transfer information in fixed-length units, such as frames.

According to the Open Systems Interconnection Basic Reference Model ("OSI Reference Model"), both ATM and Ethernet are implemented at the data link layer, also known as layer two (L2) of the network stack. That is, ATM and Ethernet are viewed as L2 protocols. The data link layer provides the means for interacting with the underlying physical layer (L1) to transfer data units between network devices. The Point-to-Point Protocol (PPP) and the Point-to-Point Protocol over Ethernet (PPPoE) are also implemented at the data link layer of the network stack. PPP over ATM and PPPoE are generally implemented over ATM and Ethernet. PPPoE may also be implemented over ATM as PPPoEoA. Accordingly, PPP and PPPoE have been recognized as "upper layer two" protocols, while ATM and Ethernet have been recognized as "lower layer two" protocols.

The third layer (L3) of the OSI Reference Model is referred to as the network layer and is logically viewed as implemented above or on the data link layer of the network stack. The network layer provides the means for transferring data across networks, typically in the form of variable length packets, and may include network routing functions. The Internet Protocol (IP) is the most common example of a network layer protocol. The network layer also provides functionality that may be required by higher layers of the network stack. For example, the network layer maintains quality of service for the transport layer.

Service provider networks include network access devices that provide subscribers with access to the Internet or other networks. For example, multiple subscriber devices may connect to a network switch, e.g., a digital subscriber line access multiplexer (DSLAM), maintained by the service provider network. In many cases, data for the multiple subscriber devices connected to the network access device may be transported over separate physical connections or over a shared physical connection. In any case, the network access device of the service provider typically constructs an interface stack having one or more logical subscriber interfaces to handle communications for each of the subscriber devices. For example, for a given subscriber device, the network access device may configure an interface stack (i.e., a stack of logical interfaces providing functions conforming to the layers of the OSI network model) for a subscriber communicating using PPP over an ATM virtual circuit (VC) or PPPoE over an Ethernet virtual local area network (VLAN) and hence provide connectivity to the Internet. The network access device may create the interfaces of the interface stack statically, dynamically or a combination thereof.

SUMMARY

In general, techniques are described for managing network connections for network subscribers. The techniques may be applied to achieve graceful handling of situations where one or more higher-layer interfaces of an interface stack provided by a network access device have terminated (i.e., torn down) while the lower-layer interfaces remain operational. The techniques may, for example, be applied to achieve faster restart of the absent interfaces to reduce the impact to the subscriber.

As detailed herein, techniques are described for using a modified lower layer two (L2) software interface that is enhanced to operate as a proxy for an upper L2 software interface when the upper L2 software interface has been torn down. The lower L2 software interface may, for example, be extended to incorporate certain features of the upper L2 software interface. As one example, in the absence of the upper L2 software interface, the lower L2 software interface may output a simulated termination request on behalf of the upper layer two software interface.

In an example embodiment, the network access device provides a modified lower L2 software interface conforming to the Asynchronous Transfer Mode (ATM) and an upper L2 software interface conforming to the Point-to-Point Protocol (PPP). The network access device, in one embodiment, may build a dynamic interface stack which includes PPP over ATM. The dynamic interface stack utilizes a virtual circuit with a subscriber device. In another embodiment, the network access device may build a dynamic interface stack which includes PPP over PPPoE over ATM. The process of creating a dynamic interface stack is discussed in greater detail in co-pending U.S. patent application Ser. No. 11/402,145, Cabeca et al., "Dynamic Building of VLAN Interfaces Based on Subscriber Information Strings," filed Apr. 11, 2006, and Ser. No. 11/540,923, Roche et al., "Forwarding Traffic to VLAN Interfaces Built Based on Subscriber Information Strings," filed Sep. 29, 2006, the entire contents of each of which are hereby incorporated herein by reference in their respective entireties.

In some instances, the dynamic PPP interface may be torn down in response to a number of different conditions, such as a chassis reboot, a line card reboot, or failure of a lower layer interface. In some situations, the PPP interface may not have sent a Link Control Protocol (LCP) termination request informing the peer subscriber device that the interface has been terminated. Moreover, the subscriber device may not be able to detect termination of the interface and initiate communication renegotiation for a significant period of time if at all. The techniques described herein may be applied to achieve faster restart of the absent interfaces and subscriber device to reduce the impact to the subscriber.

In one embodiment, a network device comprises a static lower layer two (L2) software interface that process communications from a lower L2 software interface of a subscriber device in accordance with a lower L2 network protocol, and a dynamic upper L2 software interface that processes communication from an upper L2 software interface of the subscriber device in accordance with an upper L2 network protocol. When the upper L2 software interface of the network device is terminated without notifying the subscriber device, a proxy software module of the lower L2 software interface of the network device operates on behalf of the upper L2 software interface of the network device and outputs a termination request in accordance with the upper L2 network protocol to reinitiate communications in accordance with the upper L2 network protocol.

In another embodiment, a method comprises receiving, with a network device, a network access request from a subscriber device. The method further comprises establishing, within the network device, a lower layer two (L2) software interface that process communications in accordance with a lower L2 network protocol, and establishing, within the network device and in response to the network access request, a dynamic, subscriber-specific upper L2 software interface that processes communication from the subscriber device in accordance with an upper L2 network protocol. The method further comprises terminating the upper L2 software interface of the network device in response to an event; and, when the upper L2 software interface of the network device is terminated, such that the upper L2 software interface is unable to notify the subscriber device, outputting a termination request from the lower L2 software interface in accordance with the upper L2 network protocol to reinitiate communications with the subscriber device in accordance with the upper L2 network protocol.

The techniques described herein may provide several advantages. As one example, the network access device may apply the techniques herein to inform the subscriber device directly that the one or more higher-layer interfaces have been torn down and, as a result, a communication session at the layer has been terminated. In this manner, the subscriber device may be informed earlier rather than waiting to determine this on its own using a keepalive type mechanism associated with the higher-layer protocol. This may be particularly useful if the subscriber device either does not support the keepalive mechanism or if the mechanism has been disabled. Furthermore, the techniques may allow the subscriber device to perform reinitialization of communication with the network access device completely transparently to a user, rather than waiting for human intervention.

As a specific example, the PPP Link Control Protocol includes keepalive messages in the form of echo requests which are usually sent every thirty seconds or longer, and the subscriber device only determines that communication has ended after three unanswered echo requests. As a result, the typical time to determine that communication has ended is somewhere between 90-120 seconds. If for some reason the subscriber device does not periodically send echo requests, the time to reinitialize communication could be on the order of minutes or longer, potentially until there is human intervention or until an inactivity timer on the subscriber device expires. In some cases, a subscriber device may not support the sending of PPP echo requests. For example, this may occur due to vendor implementation of the subscriber device, or where the user has disabled this feature. The techniques may also increase the speed at which a subscriber device is able to determine that a connection with a server has been terminated, thereby increasing the speed at which communication can be reestablished.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
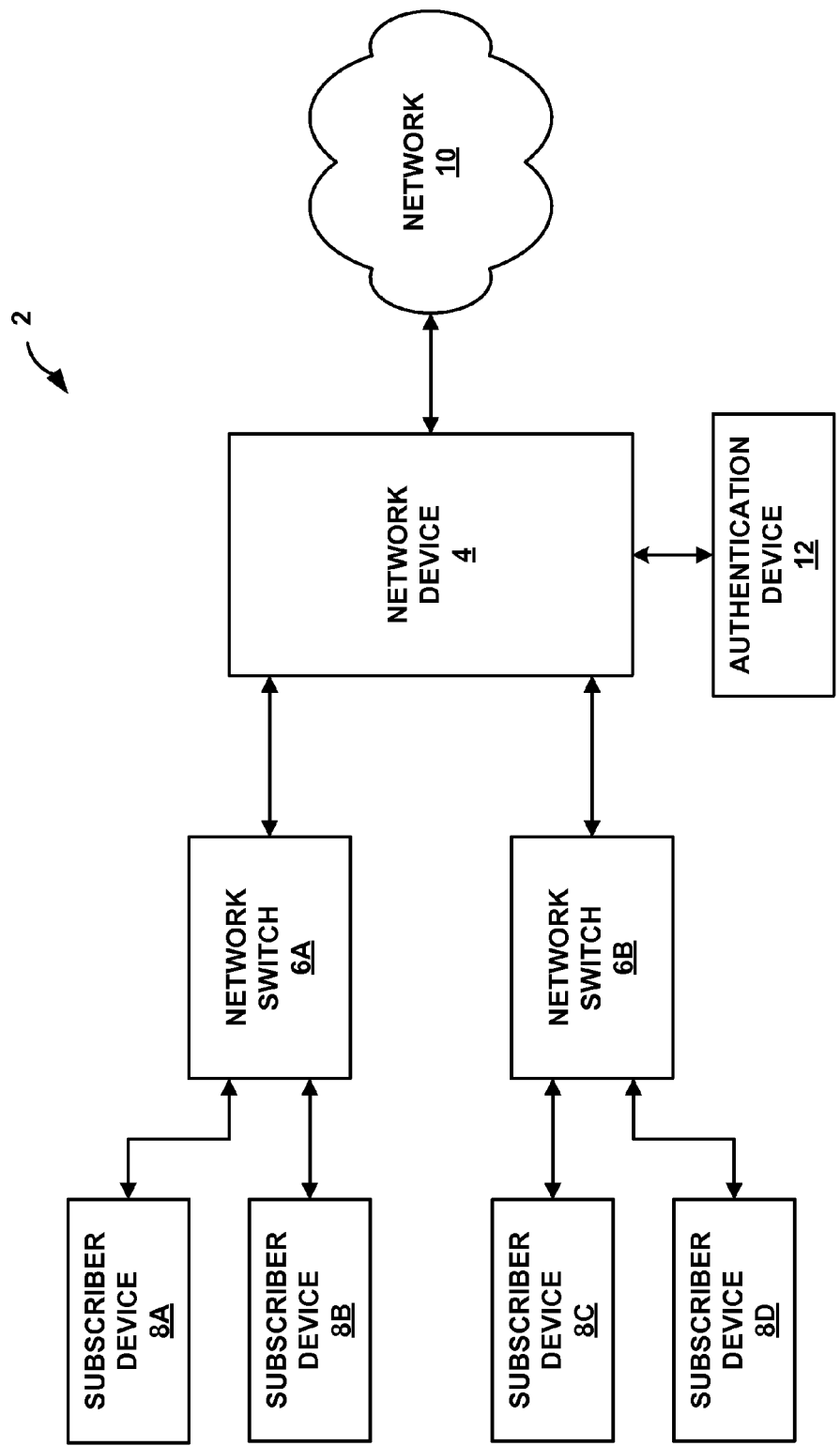
FIG. 1 is a block diagram illustrating an exemplary system in which a network access device provides subscriber devices with connectivity to a network.

FIG. 1 is a block diagram illustrating an exemplary system 2 in which a network device 4 provides subscriber devices 8A-8D ("subscriber devices 8") with connectivity to a network 10. Subscriber devices 8 may connect to network device 4 via intermediate network switches 6A and 6B ("network switches 6").

Network 10 represents any computer network and may have a variety of networked resources capable of data communication. For example, network 10 may include routers, hubs, gateways, servers, workstations, network printers and faxes or other devices. Network 10 may comprise an Internet Protocol (IP) network that includes both an IP version four (IPv4) portion and an IP version six (IPv6) portion. Moreover, network 10 may represent the Internet or any public or private network.

Subscriber devices 8 represent any customer-side access device, such as a cable modem, digital subscriber line (DSL) modem, wireless access point, gateway or other device that provides connectivity to client-side devices, such as personal computers, laptops, workstations, personal digital assistants (PDAs), wireless devices, network-ready appliances, file servers, print servers or other devices. In some cases, subscriber devices 8 may be included within one or more customer networks. For example, subscriber devices 8A and 8B may be included in one customer network, and subscriber devices 8C and 8D may be included in another customer network. Customer networks represent networks established by individuals or companies for internal communication and may include local area networks (LANs) or wide area networks (WANs) that comprise a plurality of subscriber devices. In some embodiments, customer networks may be customer-specific networks that use the Asynchronous Transfer Mode (ATM) protocol to communicate information in fixed or variable-sized units referred to as frames. Other embodiments may use other layer two protocols, and the techniques should not be understood to be limited to ATM.

In the illustrated example, subscriber devices 8A and 8B connect to network device 4 via network switch 6A, and subscriber devices 8C and 8D connect to network device 4 via network switch 6B. In other embodiments, any number of network switches 6 may connect to network device 4 and any number of subscriber devices 8 may connect to each of the network switches. In one embodiment, network switches 6 may comprise digital subscriber line access multiplexers (DSLAMs) or other switch devices. Each of subscriber devices 8 may utilize a Point-to-Point Protocol (PPP), such as PPP over ATM or PPP over Ethernet (PPPoE), to communicate with network device 4. For example, using PPP, one of subscriber devices 8 may request access to network 10 and provide login information, such as a username and password. PPP may be supported on lines such as digital subscriber lines (DSLs) that connect subscriber devices 8 with network device 4. In other embodiments, subscriber devices 8 may utilize a non-PPP protocol to communicate with network switches 6. Other embodiments may use other lines besides DSL lines, such as Ethernet over a T1, T3 or other access link.

Each of network switches 6 may communicate with network device 4 over a physical interface supporting various protocols, e.g., an ATM interface supporting ATM protocols. Network device 4 typically includes Broadband Remote Access Server (BRAS) functionality to aggregate output from switches 6 into a higher-speed uplink to network 10. In some embodiments, network device 4 may comprise a router that maintains routing information between subscriber devices 8 and network 10.

In general, network device 4 constructs an interface stack having one or more logical subscriber interfaces to handle communications for each of the subscriber devices 8. That is, for a given subscriber device 8, the network access device 4 may configure one or more logical interfaces providing data processing functions conforming to the layers of the OSI network model to handle communications to and from the respective subscriber device. For example, network device 4 may construct an interface stack having a PPP interface over an ATM interface, which may include an ATM sub-interface such as an ATM 1483 sub-interface, for processing subscriber communications received using PPP over an ATM virtual circuit (VC). Similarly, in another embodiment, network device 4 may construct an interface stack having a PPP interface over a PPPoE interface over an Ethernet interface for processing subscriber communications received via PPP over an Ethernet virtual local area network (VLAN) and hence provide connectivity to the Internet. Network device 4 may create the interfaces of the interface stack statically (i.e., pre-configured by an administrator), dynamically (i.e., upon detecting a request for services of a specific type), or a combination thereof.

In general, the term "interface" is used herein to refer to a software interface that is created or otherwise instantiated within a network device to support network communications. The term "interface stack" refers to a layered representation of multiple software interfaces that may be viewed as a stack or a column of interfaces. Network data propagates up or down the interfaces of the interface stack within network device 4, and each interface typically corresponds with a different network communication protocol or format. In general, the software interfaces of the interface stack created by the network device correspond with one or more layers of the seven layer Open System Interconnection (OSI) networking model. In one embodiment, lower L2 ATM sub-interfaces may include ATM 1483 sub-interfaces and ATM AAL sub-interfaces. In another embodiment, lower L2 sub-interfaces may be VLAN sub-interfaces. In yet another embodiment, lower L2 ATM sub-interfaces may conform to the specification of D. Grossman et al., "Multiprotocol Encapsulation over ATM Adaptation Layer 5," IETF Draft, RFC 2684 (September 1999).

In general, network device 4 applies techniques described herein to achieve more graceful and/or more efficient handling of situations where one or more higher-layer interfaces of an interface stack for a subscriber device 8 have terminated (i.e., been torn down) while one or more lower-layer interfaces remain operational. Network device 4 may, for example, apply the techniques to achieve faster restart of the subscriber device and absent interfaces to reduce the impact to the subscriber.

Network device 4 may include a modified lower L2 software interface having enhanced functions that enable the interface to operate on behalf of an upper L2 software interface in the event the upper L2 software interface has been torn down or is otherwise absent, i.e., is unable to notify the subscriber device. The lower L2 software interface may, for example, incorporate certain features of the upper L2 software interface. As one example, in the absence of the upper L2 software interface, the lower L2 software interface may output a simulated termination request on behalf of the upper layer two software interface.

In an example embodiment, network device 4 provides a modified lower L2 software interface conforming to the Asynchronous Transfer Mode (ATM) and an upper L2 software interface conforming to the Point-to-Point Protocol (PPP). In this example, the ATM sub-interface may be a static interface, i.e., a predefined interface instantiated prior to receiving a connection request from a particular subscriber device, e.g. subscriber device 8A. The PPP interface may be a dynamic interface, i.e., an interface that is dynamically constructed on a per-device or per-user basis in response to receipt of a connection request. In any case, in some instances the PPP interface may be torn down or terminated for a given one of subscriber device 8 in response to a number of different conditions, such as a chassis reboot, a line card reboot, or failure signal of a lower layer interface. In some situations, the PPP interface may not have sent a Link Control Protocol (LCP) termination request informing the peer subscriber device 8 that the PPP interface has been terminated. Moreover, the subscriber device 8 may not be able to detect termination of the interface and initiate communication renegotiation for a significant period of time if at all. The techniques described herein may be applied to achieve faster restart of the absent PPP interface and subscriber device to reduce the impact to the subscriber.

Continuing this example, subscriber device 8 may continue to transmit data packets in reliance on the presence of the dynamic interface, for instance, the upper L2 PPP interface of network device 4. The enhanced lower L2 interface, i.e., the enhanced ATM sub-interface in this example, operates as a proxy for the dynamic upper L2 PPP interface to send an LCP termination packet conforming to the PPP protocol to signal the termination of the upper L2 PPP interface. The enhanced portion of the ATM sub-interface may extract upper layer PPP identifying information from the PPP communications and form the LCP termination request based on the identifying information. The ATM sub-interface may, furthermore, send the termination request without necessarily dynamically rebuilding the terminated upper L2 PPP interface of the interface stack to reestablish the communication session. In other words, the lower L2 ATM sub-interface need not wait for the upper L2 PPP interface to be reconstructed. Instead, the lower L2 ATM sub-interface acts as an interim upper L2 software interface to construct and output a termination request that conforms to the output upper L2 protocol, i.e., PPP in this example. Upon receiving the termination packet, the corresponding subscriber device 8 may terminate the previous upper L2 communication session and reinitialize communication between itself and network device 4. Although described for purposes of example in reference to ATM, PPP, Ethernet, and PPPoE, the techniques described herein can be applied to other protocols.

Figure 2:
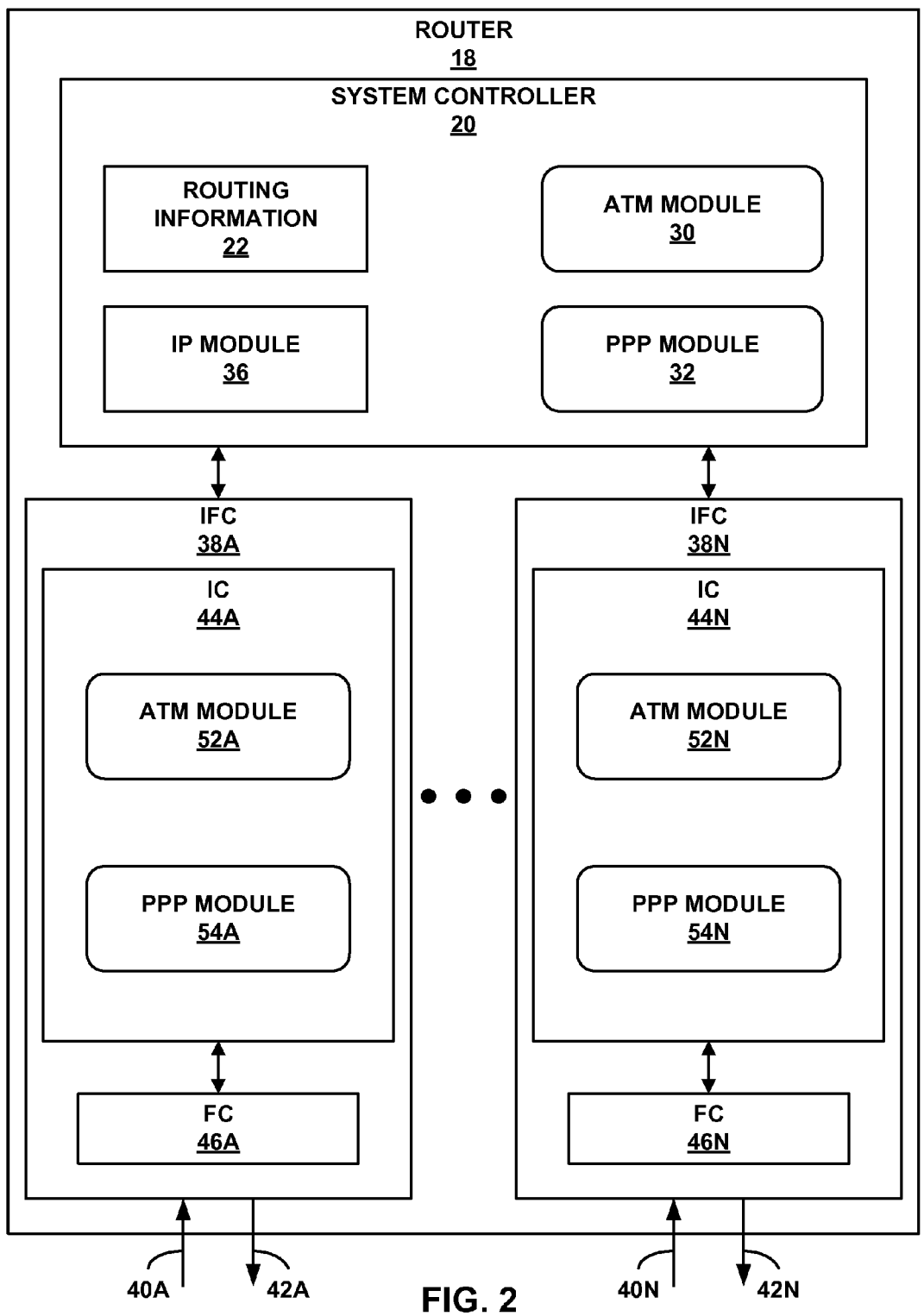
FIG. 2 is a block diagram illustrating an exemplary embodiment of a router having an enhanced lower layer two (L2) software interface in the form of an ATM module.

FIG. 2 is a block diagram illustrating an exemplary embodiment of a router 18. Router 18 may operate substantially similar to network device 4 depicted in FIG. 1. In this example, router 18 is capable of supporting IP over PPP over virtual circuits.

Router 18 includes interface cards (IFCs) 38A-38N ("IFCs 38") that receive packets on inbound links 40A-40N ("inbound links 40") and send packets on outbound links 42A-42N ("outbound links 42"). IFCs 38 are coupled to SC 20, typically via a high-speed switch (not shown). IFCs 38 include respective interface controllers (ICs) 44A-44N ("ICs 44") and forwarding controllers (FCs) 46A-46N CFCs 46"). When FCs 46 receive protocol signaling packets from subscribers, e.g., subscriber devices 8 of FIG. 1, on inbound links 40 and a system administrator has configured router 18 to dynamically build dynamic PPP interfaces. FCs 46 exception the protocol signaling packets to ICs 44. Although illustrated as located within IFCs 38, ICs 44 and FCs 46 may be located in other components of router 18, such as SC 20.

ATM modules 52 provide lower L2 interfaces for subscriber devices while PPP modules 54 provide upper L2 interfaces for the subscriber devices. ATM modules 52 may be viewed as providing enhanced lower L2 interfaces that are configured to operate on behalf of an upper L2 PPP interface in the event the PPP interface has been torn down or is otherwise absent for the particular subscriber device. The ATM sub-interface may, for example, incorporate certain features and functions of the PPP interface. As one example, in the absence of the upper PPP interface for a particular subscriber device, the lower L2 ATM sub-interface may output a simulated LCP termination request on behalf of the PPP interface and in compliance with the PPP protocol.

In one embodiment, system controller 20 and/or IFCs 38 includes a computer-readable storage medium to store executable instructions, and one or more processors to execute the instructions to perform the functions described herein.

Figure 3:
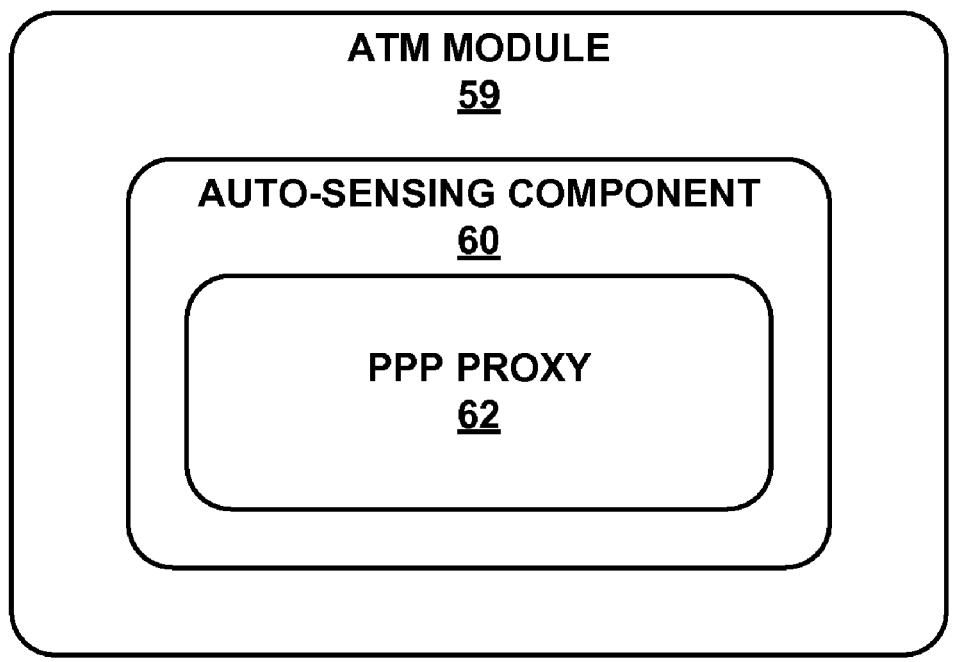
FIG. 3 is a block diagram further illustrating the ATM module of FIG. 2.

FIG. 3 is a block diagram of ATM module 59, which may be an ATM module such as one of ATM modules 30 or 52A-52N of FIG. 2. ATM module 59 is typically used for providing ATM interface (i.e., a lower L2 interface) functions of transmitting and receiving lower ATM data units over the underlying ATM physical communication medium. Although discussed with respect to an ATM module, a similar module may be utilized with respect to Ethernet interfaces or interfaces for other lower L2 protocols.

In general, ATM module 59 includes software components necessary to provide the ATM interface within an interface stack for one or more subscriber units. In one embodiment, ATM module 59 may additionally have an auto-sensing component 60 and a PPP proxy 62. Auto-sensing component 60 may be capable of detecting certain events associated with a higher-layer interface of the interface stack, such as termination of the higher-layer interface, a communication error which causes failure in the lower-layer communication or the general absence of the higher-layer interface unbeknownst to the subscriber device. For example, auto-sensing component 60 of ATM module 59 may be able to monitor upper L2 communications to detect an error condition. In addition, auto-sensing component 60 may detect an error causing a failure in the dynamically created stack, such as a system reload, a line card reload, a down condition below the PPP interface layer, a cable becoming unplugged, or for many other reasons.

In response to such an event, in accordance with the techniques described herein, auto-sensing component 60 may utilize PPP proxy 62 to operate on behalf of the absent or otherwise non-functional PPP interface provided by PPP module 32, 54. The term "proxy" is used to indicate that, in this example, the lower L2 interface provided by ATM module 59 for a particular subscriber will operate to provide certain upper L2 functions on behalf of the PPP interface in response to detecting a particular event or communication condition. That is, in addition to transmitting and receiving lower L2 packets, ATM module 59 may also be able to transmit upper L2 packets on behalf of PPP modules 32, 54A in the case that auto-sensing component 60 detects that the dynamically created portion of the network stack is down or non-responsive. In one embodiment, PPP proxy 62 may transmit PPP Link Control Protocol (LCP) packets, more specifically, LCP terminate packets, on behalf of PPP module 32, 54A to quickly inform the subscriber device of the absent upper L2 PPP interface rather than relying on the subscriber device to auto-detect the absence. PPP proxy 62 may extract header information from a PPP frame, such as a fixed identifier, in order to make such determinations and take proxy actions. PPP proxy 62 may use the fixed identifier information to construct an appropriate LCP terminate packet to send to subscriber device 8A. Upon receiving an LCP terminate packet, subscriber device 8A may restart the PPP connection.

In this way, it may be possible to gracefully and efficiently initiate the rebuilding of a dynamic interface stack without requiring that router 18 first rebuild the entire dynamic interface stack merely in order to inform the subscriber device that a previously existing interface must be rebuilt. That is, the techniques described herein may be more scalable than requiring that router 18 first rebuild the dynamic interface stack in order to send the LCP terminate packet using either PPP module 32 or 54A.

Such a detection and rebuilding process may be faster than, for example, waiting for a user to interact with the subscriber device and reset the connection manually. Moreover, the detection and rebuilding process may be even faster than waiting for a keepalive function of the subscriber device to detect that the PPP connection has stalled because typically a predefined number of unanswered keepalive echo requests must occur before the subscriber device initiates a restart of the PPP connection. Although discussed with reference to PPP, a similar component could be utilized with respect to other upper L2 protocols. For instance, PPP proxy 62 may be modified to function with respect to PPP over Ethernet (PPPoE).

Figure 4A:
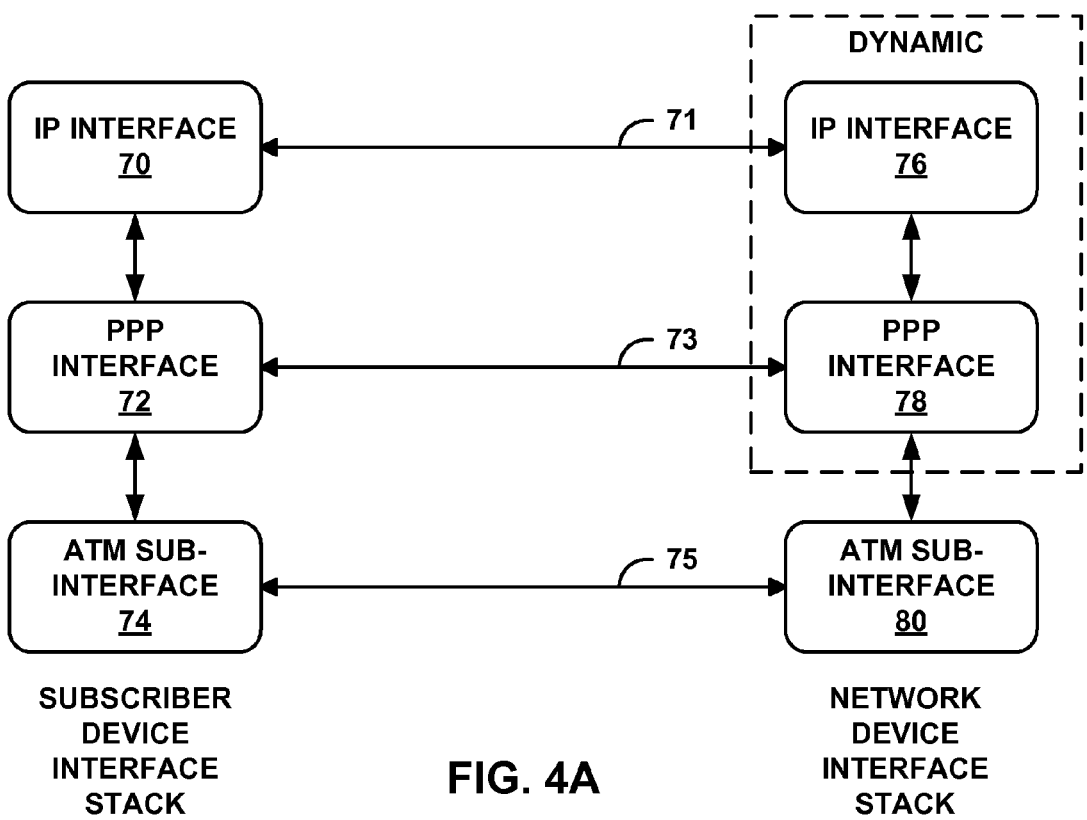
FIGS. 4A-4C are block diagrams illustrating an exemplary interface stack.
Figure 4B:
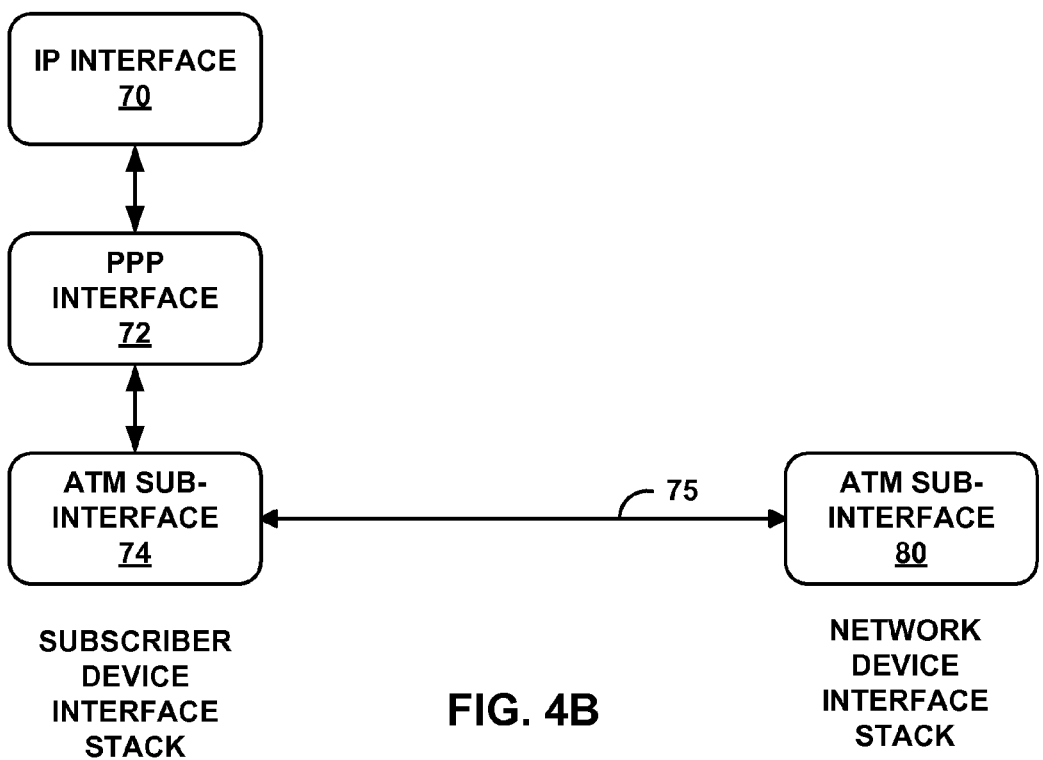
Figure 4C:
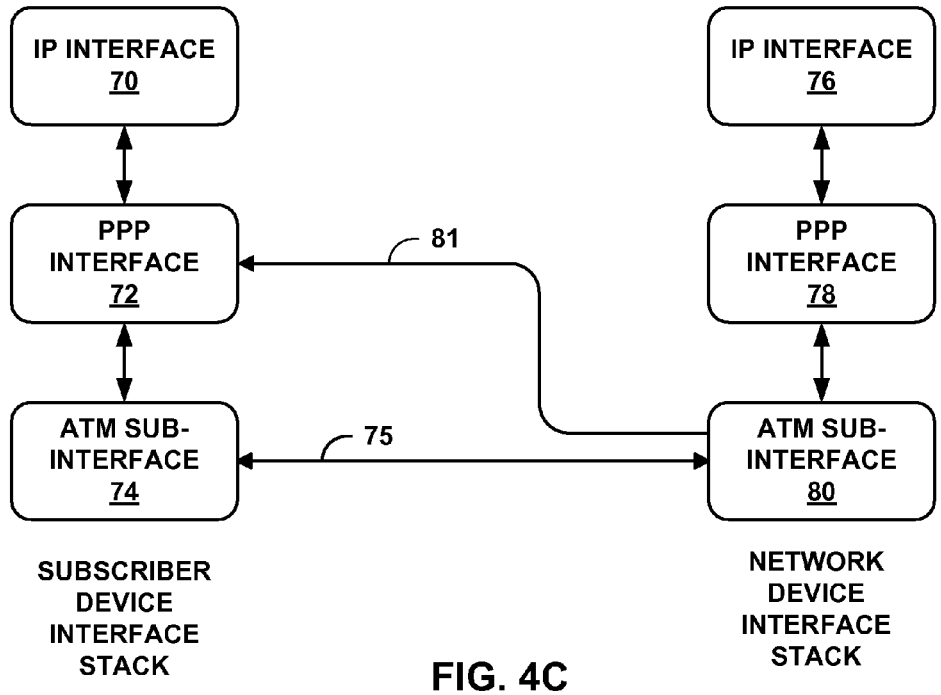

FIGS. 4A-4C are block diagrams illustrating an exemplary interface stack. FIGS. 4A-4C depict a protocol stack built with respect to an ATM sub-interface. Although the discussion of this network stack focuses on ATM, a similar network stack could be built with respect to other L2 protocols using the techniques described herein. For instance, the network stack as depicted could be modified with respect to PPP over PPP over Ethernet (PPPoE) or other L2 protocols.

As used herein, the terms "ATM interface" or "ATM major interface" refer to the interface making up the lower L2 interface. An ATM major interface is always static. An ATM major interface includes an interface stack of ATM 1483 over ATM AAL5 over ATM. The lower ATM portion of the stack performs segmentation and reassembly of packets into cells. ATM AAL5 encapsulates variable sized frames from upper layers into a form that the lower ATM layer can send and receive. ATM 1483, also referred to herein by the term "ATM sub-interface," optionally encapsulates packets from the upper L2 interfaces to support multiple protocols operating on the same ATM circuit. The ATM sub-interface may be either static or dynamic. In the case that the ATM sub-interface is dynamic, the ATM interface constructs the ATM sub-interface upon first receiving a packet from a subscriber device. The ATM AAL5 and ATM portions of the stack are always static. However, the ATM sub-interface can be considered "static" in that the ATM sub-interface is persistent even after events which cause the dynamic interface stack to fail, such as a chassis reboot, a line card reboot, or failure of a lower layer interface.

FIG. 4A depicts functioning network stacks as provided by a network access device and a particular subscriber device. According to the OSI model, at each layer the devices communicate with each other according to the protocols of that layer with limited regard to the layers above or below. That is, each layer treats the other layers as "black boxes" with which they may interact. From the perspective of a given layer, communication occurs with other entities on that layer.

For instance, as depicted in FIG. 4A, entities at the third layer issue L3 communications 71 to each other on that layer using transmission units known as datagrams. The illustration depicts IP as a general layer three (L3) protocol; many suitable protocols exist at this layer, such as IPv4, IPv6, AppleTalk, IPX, etc., any of which may be used. Communications 71 may be thought of as an abstract link, also referred to as a logical session or L3 connection. For example, from the perspective of the entities at the IP layer, the IP interface 70 of a subscriber device communicates with the IP interface 76 of the network device. This occurs due to data abstraction as IP datagrams are transferred first to the lower layers, next transmitted as the lowest layer communications 75, and then received from the lower layers at the destination IP layer. Similarly, the upper L2 software interface, exemplified as PPP interface 72 in FIG. 4A, of a subscriber device may communicate with the PPP interface 78 of a network device via communications 73 using data transmission units known as frames.

ATM sub-interface 74 of a subscriber device and the ATM sub-interface 80 of a network device communicate over a physical link 75 by transferring the frames to the physical layer for communications as fixed-length ATM cells. In another embodiment, using PPPoE, packets may be variable length. The term "packet" may be used herein generically to refer to any data transmission unit of fixed or variable length.

The example of FIG. 4A also differentiates between interfaces which, in this example, are static and interfaces which are dynamic. In one embodiment, interfaces for ATM communications 75 may be static and interfaces for higher layers, e.g. PPP and IP, may be created dynamically as a dynamic interface stack. ATM sub-interfaces 74, 80, for ATM communications 75, are "static" in that configuration of the interface is pre-defined by an administrator and a connection exists as long as two devices are physically coupled. That is, ATM sub-interfaces 74, 80 may be persistent after a system reload, a line card reload, a cable becoming disconnected and subsequently reconnected, or any down condition below the PPP interface layer; two devices may communicate via ATM as long as they are physically connected. Moreover, a single ATM sub-interface (e.g., ATM sub-interface 80) may provide ATM services for a plurality of subscriber devices. In the case of higher layers, communication may be established dynamically, which requires building an interface stack on top of the static ATM interface as described above. Dynamic interfaces 76, 78 form a dynamic interface stack that is not persistent and must be reestablished in the event one or more of the interfaces are terminated or otherwise fail, e.g., after a system reload, a line card reload, or after a cable is disconnected and then reconnected. Dynamic interfaces may be created on a per-subscriber device basis.

FIG. 4B illustrates the state of the interface stack as depicted in FIG. 4A upon the occurrence of an event which disrupts the dynamic interface stack. Because ATM sub-interfaces 74, 80 are static, once the error has been resolved, the ATM layer of each device may continue to communicate via link 75. However, because IP interface 76 and PPP interface 78 are dynamic, communications 71 and 73 are severed in the case of an event that terminates or otherwise stalls the interfaces. In the example of FIG. 4B, dynamic IP interface 76 and PPP interface 78 have been torn down on the network device in response to some event. IP interface 70 and PPP interface 72 within the interface stack of the subscriber device are not torn down since, in this example, the absence of the dynamic interfaces on the network device has not yet been detected by the subscriber device.

FIG. 4C illustrates one embodiment of the techniques described herein. As depicted in FIG. 4C, ATM sub-interface 80 of network device 4 may detect the condition illustrated in FIG. 4B and proxy for the higher-layer dynamic links at PPP interface 78. For example, ATM sub-interface 80 may intervene and instruct subscriber device 8A, on behalf of PPP interface 78, to restart LCP negotiation. That is, auto-sensing component 60 of FIG. 3, operating at ATM sub-interface 80 of network device 4, may extract a fixed identifier from a received PPP frame for which a dynamic PPP interface no longer exists (as shown in FIG. 4B). This is in contrast to normal operation, wherein PPP module 32, 54A-54N of network device 4 would communicate with the PPP module of subscriber device 8A.

Due to the error that caused tearing down of the dynamic interface stack, this normal PPP communication intercepted by the auto-sensing component 60 can no longer be serviced by the absent interfaces. By extracting this information, ATM sub-interface 80 of network device 4 may communicate directly with PPP interface 72 of subscriber device 8A by constructing and outputting a proxy communication 81. ATM sub-interface 80 may, for example, construct and transmit a PPP link control protocol (LCP) termination packet to PPP interface 72 of subscriber device 8A. In response, subscriber device 8A may gracefully end the current PPP session and start a new PPP session, which may involve renegotiation of the communications sessions and ultimately cause the network device to construct a new PPP interface 78 and IP interface 76 as shown in FIG. 4C.

Figure 5:
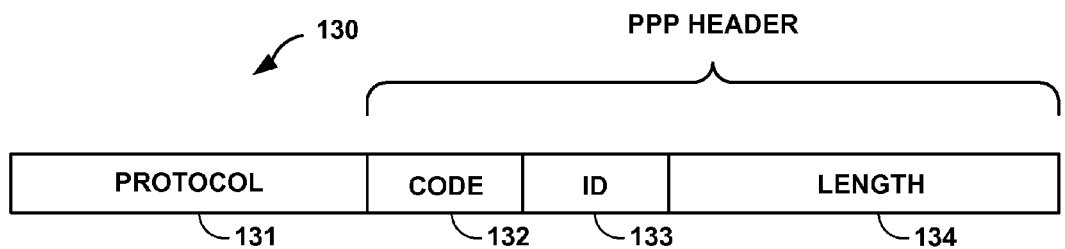
FIG. 5 is a block diagram illustrating an exemplary PPP Link Control Protocol (LCP) terminate request frame.

FIG. 5 is a block diagram illustrating exemplary PPP LCP frame 130 as constructed by auto-sensing component 60 of ATM sub-interface 80, specifically as an LCP terminate request frame. In one embodiment, PPP LCP frame 130 includes PPP protocol identifier field 131 (2 bytes) and a PPP header including code field 132 (1 byte), ID field 133 (1 byte) and length field 134 (2 bytes). For an LCP terminate request frame, protocol identifier field 131 is set according to the PPP LCP Protocol (0xC021), code field 132 is set according to a terminate request (0x05), ID field 133 is the sequence number and is fixed at 0x01, and length field 134 is the length of the PPP header plus any options sent. As no options are typically sent with a terminate request, the value of this field is 0x0004.

The ATM sub-interface may optionally add the ATM1483 header encapsulation before sending LCP terminate request frame 130 to the lower ATM interface. The lower ATM interface may add the AAL5 trailer and then transmit the frame as a series of fixed ATM cells.

Figure 6:
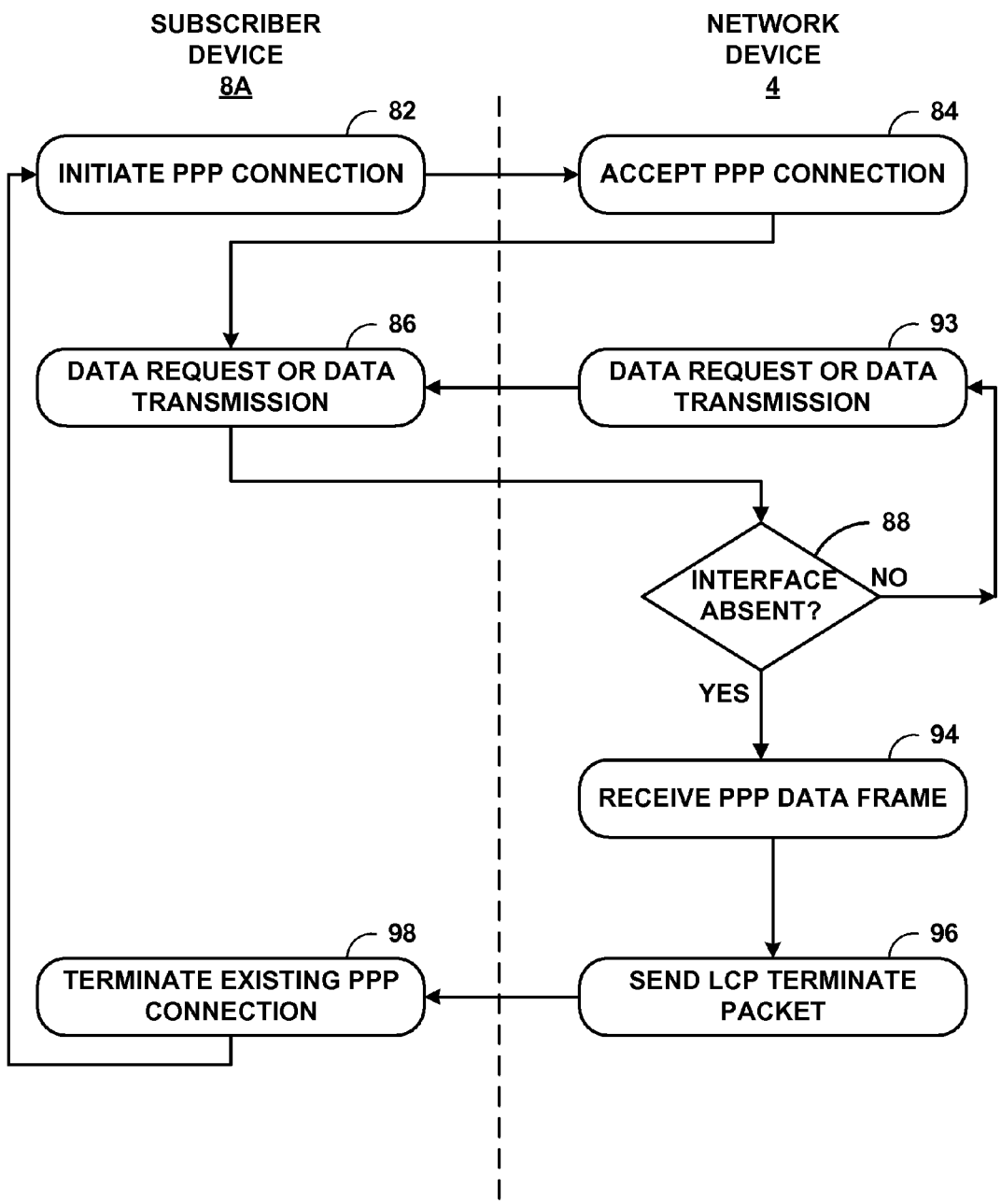
FIG. 6. is a flowchart illustrating exemplary operation of a network device in accordance with one embodiment of the techniques as applied to the Point-to-Point Protocol for purposes of example.

FIG. 6 is a flowchart illustrating exemplary operation in accordance with one embodiment of the techniques described herein as applied to the Point-to-Point Protocol. Initially, a subscriber device, for instance, subscriber device 8A, may initiate a PPP connection with network device 4 (82). This may be in response to a user request or other request for data from a network. To establish a perform PPP connection, in accordance with the protocol, subscriber device 8A first transmits a Link Control Protocol (LCP) initiation packet, called a configure request packet, to network device 4. This packet consists of four fields: a code field (1 byte), an identifier field (1 byte), a length field (2 bytes), and an options field (variable length).

Once network device 4 has received the LCP initiation packet from subscriber device 8A, network device 4 will then send an LCP packet to confirm receipt of the initiation packet from subscriber device 8A. This may be a "configure-ack" packet, for acknowledgement, if a communication link can be established (84). If for some reason communication cannot be established, network device 4 may send a "configure-nak" packet, for not acknowledged, or a configure-reject packet, meaning communication cannot be established to subscriber device 8A. In the case where communication can be established, network device 4 may build an interface stack for servicing communications from the subscriber device.

Assuming a PPP session has been established, subscriber device 8A may send data communications to network device 4 in the form of data packets (86). If an error in the link does not occurred ("NO" branch of 88), network device 4 will send or receive data based on the contents of the data packet from subscriber device 8A (93) and wait for more data or data requests from subscriber device 8A (86).

However, at any point, an event may occur leading to the PPP interface and possibly higher-layer interfaces of a network device to fail or be torn down (88). For example, a system restart, hardware event, chassis reboot, events or failures at lower-layer interfaces or a variety of other conditions may cause the PPP interface to fail or be torn down on the network device without notifying the subscriber device. This result is typically signaled to the underlying interface, i.e., ATM sub-interface 80, to inform the ATM sub-interface that the higher-layer interface(s) for the subscriber(s) have been removed and are unavailable to receive communications. Accordingly, it may no longer be possible for data to be transmitted and received properly between corresponding entities at higher-layers.

If such an event has occurred, ("YES" branch of 88) and subscriber device 8A has not yet detected that the dynamic interface stack has been torn down, auto-sensing component 60 may intercept a PPP data frame from the subscriber device destined for the absent PPP interface (94), at which point auto-sensing component 60 may determine that subscriber device 8A has not yet discovered that communication has been interrupted due to the error. If subscriber device 8A had been aware of the error and broken dynamic interface stack, subscriber device 8A would have instead sent an LCP initiation request packet, rather than a PPP frame carrying data.

In the case where an error has occurred, network device 4 may use PPP proxy module 62 of ATM module 59 (FIG. 3) to proxy for the absent PPP interface provided by PPP module 54. PPP proxy module 62 (FIG. 3) may construct and transmit a session-specific LCP termination packet to subscriber device 8A (96). The manner in which PPP proxy 62 constructs the LCP termination packet on behalf of PPP module 32, 54 is described in further detail below with respect to FIG. 7. In accordance with the PPP protocol, the LCP termination packet is a Terminate-Request packet.

Upon receiving an LCP termination packet, subscriber device 8A will terminate the existing PPP connection (98). In accordance with the PPP protocol, subscriber device 8A may send a Terminate-Ack packet to acknowledge the reception of the terminate request packet. Once subscriber device 8A has terminated the existing PPP session, subscriber device 8A initiates negotiation of a new PPP session, causing the network device to rebuild the dynamic interfaces. Communication may proceed normally after this point. If another error occurs, causing a failure of the dynamic interface stack, this recovery process may be repeated. Communication may proceed in this fashion until subscriber device 8A no longer needs to send or receive data from network device 4.

Figure 7:
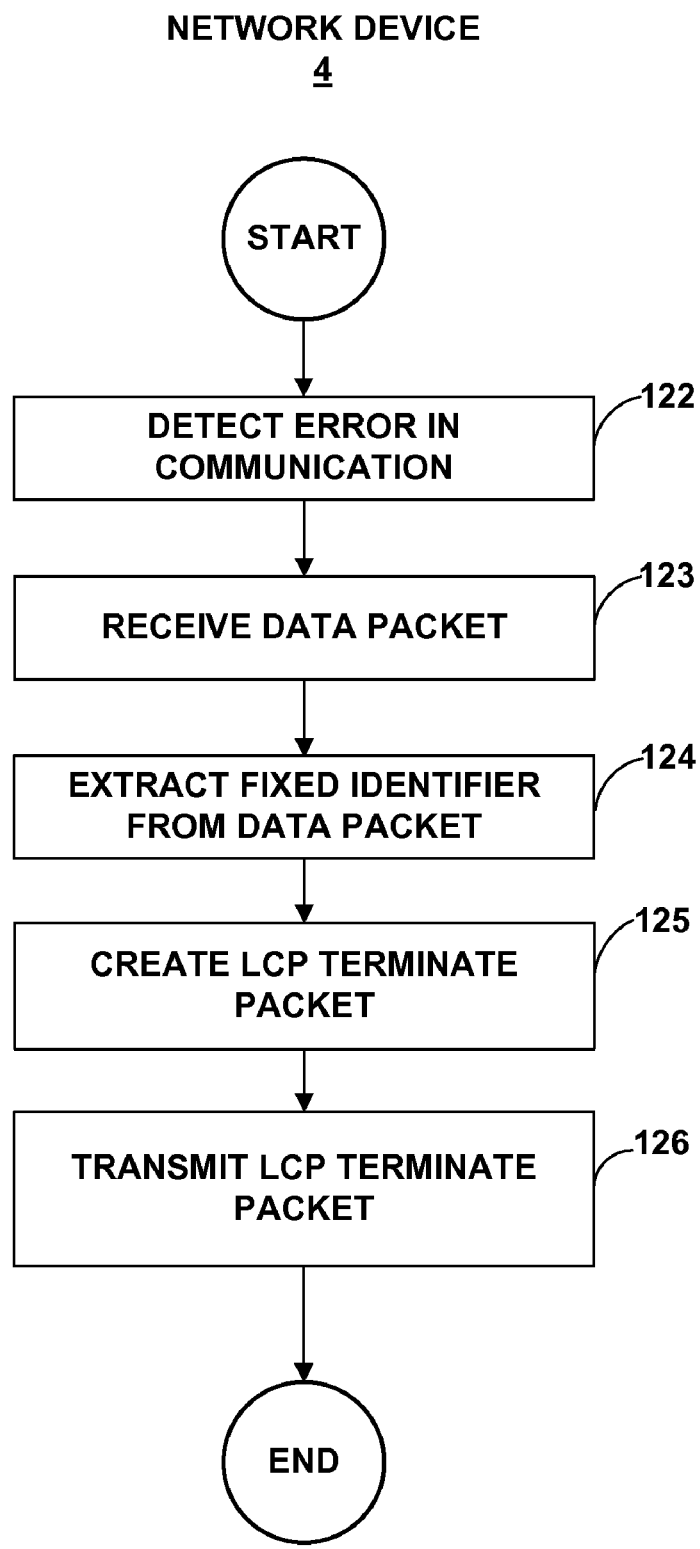
FIG. 7 is a flowchart further illustrating the exemplary operation depicted in FIG. 6, depicting the way in which ATM acts as a proxy for PPP.

FIG. 7 is a flowchart further illustrating the exemplary operation depicted in FIG. 6 in which an ATM sub-interface constructed by ATM module 59 proxies for a PPP interface constructed by PPP modules 32, 54. That is, FIG. 7 is a further illustration of the example operation of one embodiment of steps 94 and 96 of FIG. 6. Initially, a PPP communication session between subscriber device 8A and network device 4 has been negotiated and the appropriate interface stacks have been created. At some point, an event occurs which causes the removal of the dynamic interfaces at the network device. As described above, auto-sensing component 60 of the ATM sub-interface may be able to detect such an error (122).

If subscriber device 8A does not detect the error, subscriber device 8A may send a PPP data packet to network device 4 under the assumption that communication is operating normally. When network device 4 receives a data packet from subscriber device 8A (123), auto-sensing component 60 may determine that subscriber device 8A has not yet detected the error in the communication. In this case, PPP proxy 62 of network device 4 may extract identifying information from the PPP packet (124), for instance, identifier 132, sent by subscriber device 8A, and construct the LCP termination packet using identifier 132, which may vary on a per-session basis. PPP proxy 62 may extract the least amount of information possible to form the LCP termination packet, e.g., only the session-specific fixed identifier. PPP proxy 62 then forms the LCP termination packet using the extracted information (125). In normal operation, i.e., when the dynamic interface stack is operational, construction of a LCP termination packet would normally occur in the PPP interface created by PPP module 54 to service PPP communications from the subscriber device. However, due to the error interrupting the dynamic interface stack, this is no longer possible because the corresponding PPP interface has been removed. Upon PPP proxy 62 creating the LCP termination packet without network device 4 first rebuilding the entire dynamic interface stack, the network device transmits the LCP termination packet to subscriber device 8A. The LCP termination packet instructs subscriber device 8A to terminate the existing PPP session and restart. That is, subscriber device 8A will then create a new LCP configure request packet and send the configure request packet to network device 4. Upon receipt and detection of the LCP configure request packet, network device 4 will initiate dynamic PPP interface re-creation.

Figure 8:
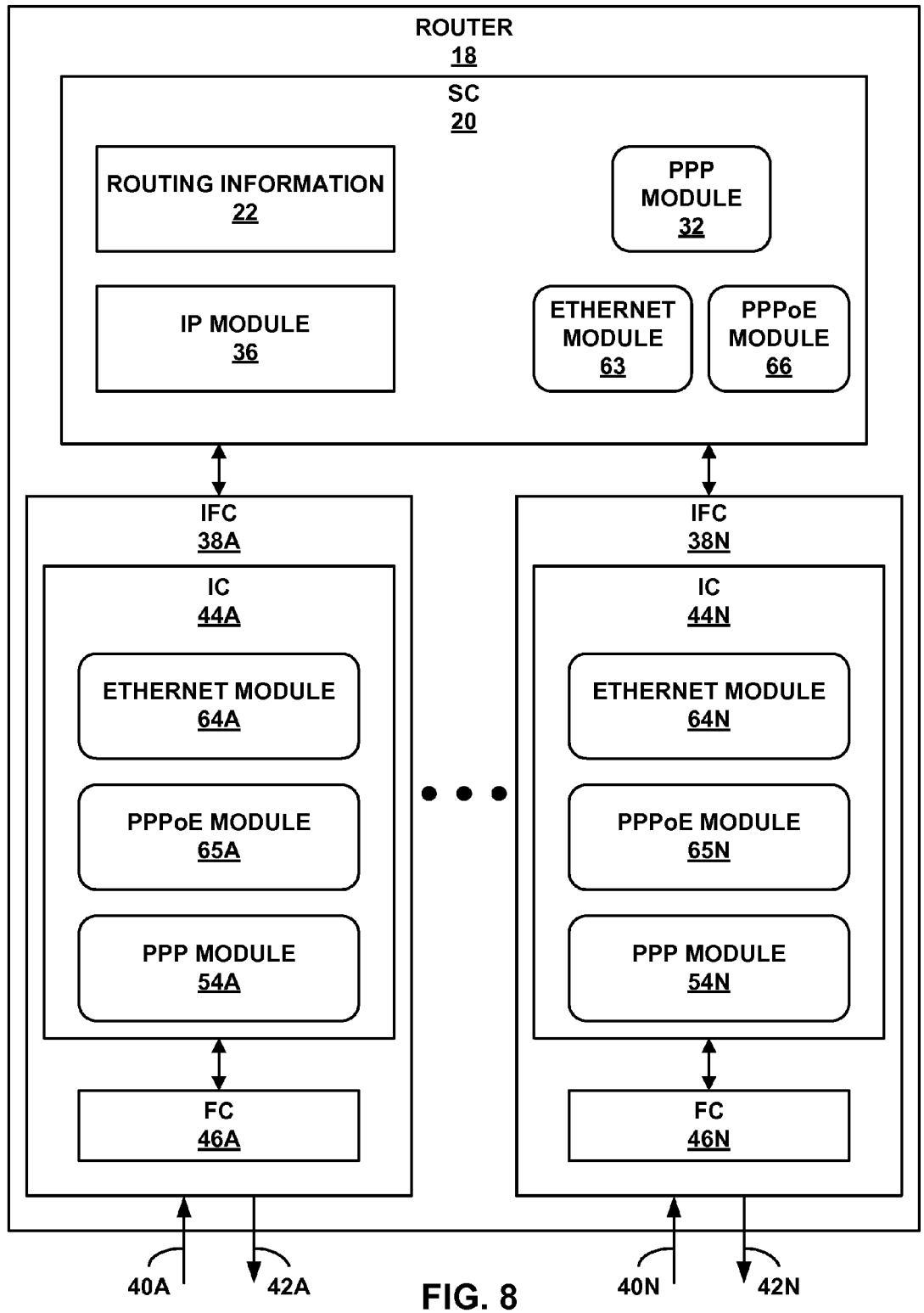
FIG. 8 is a diagram illustrating another exemplary embodiment of a router, implemented with respect to Ethernet and PPP over Ethernet (PPPoE).

FIG. 8 is a diagram illustrating another possible embodiment of a router 18' that operates substantially as described above to provide services for Ethernet and PPP over Ethernet (PPPoE). Substantially all of the components are similar to router 18 illustrated in FIG. 2. However, Ethernet modules 63 and 64A-64N replace ATM modules 30 and 52A-52N. Router 18' also includes PPPoE modules 65A-65N and 66 in addition to PPP modules 32 and 54A-54N. The substituted modules perform substantially the same functions as their counterparts, taking into account the necessary variations in the protocols. For instance, Ethernet modules 63, 64A-64N may comprise an auto-sensing component and PPP and PPPoE proxy component similar to ATM module 59 shown in FIG. 3.

Router 18' of FIG. 8 is configured to provide connectivity for PPPoE. In such an embodiment, router 18' may be configured to build dynamic interface stacks in which a PPP interface is constructed over the PPPoE interface. Router 18' may respond to PPP Active Discover Session Initiation and Request packets in accordance with the PPPoE protocol. Router 18' may construct a PPPoE major interface similar to the techniques as described above. Once the PPPoE major interface is built, an interface card (e.g., FC 46A) may receive a PPPoE Active Discover Request (PADR) packet and forward the PADR packet to the Ethernet module, which in turn sends the PADR packet to the PPPoE module to establish a PPPoE session. In response to the PADR packet, the PPPoE module dynamically builds the remaining PPPoE layers. During this session-establishing procedure, the PPPoE module may build a PPPoE sub-interface over the PPPoE major interface, over which it may build a PPP interface, and over which it may build an IP interface.

After establishment of the PPPoE session for packets including a particular session ID, FC 46A forwards data packets with the session ID directly to the PPPoE interface stack and exceptions PPPoE PADT packets directly to the PPPoE interface. On the other hand, FC 46A will continue to exception PPPoE PADI and PADR packets to the Ethernet module even after the session has been established.

Ethernet modules 64 provide lower L2 interfaces for subscriber devices while PPPoE modules 65 and PPP modules 54 provide upper L2 interfaces for the subscriber devices. Ethernet modules 64 may be viewed as providing enhanced lower L2 interfaces that are each configured to operate on behalf of an upper L2 PPPoE interface in the event the respective PPPoE interface has been torn down or is otherwise absent for the particular subscriber device. The Ethernet interface may, for example, incorporate certain features and functions of the PPPoE interface. As one example, in the absence of the upper PPPoE interface for a particular subscriber device, the lower L2 Ethernet interface may output a simulated termination request on behalf of the PPPoE interface and in compliance with the PPP and PPPoE protocols.

Figure 9:
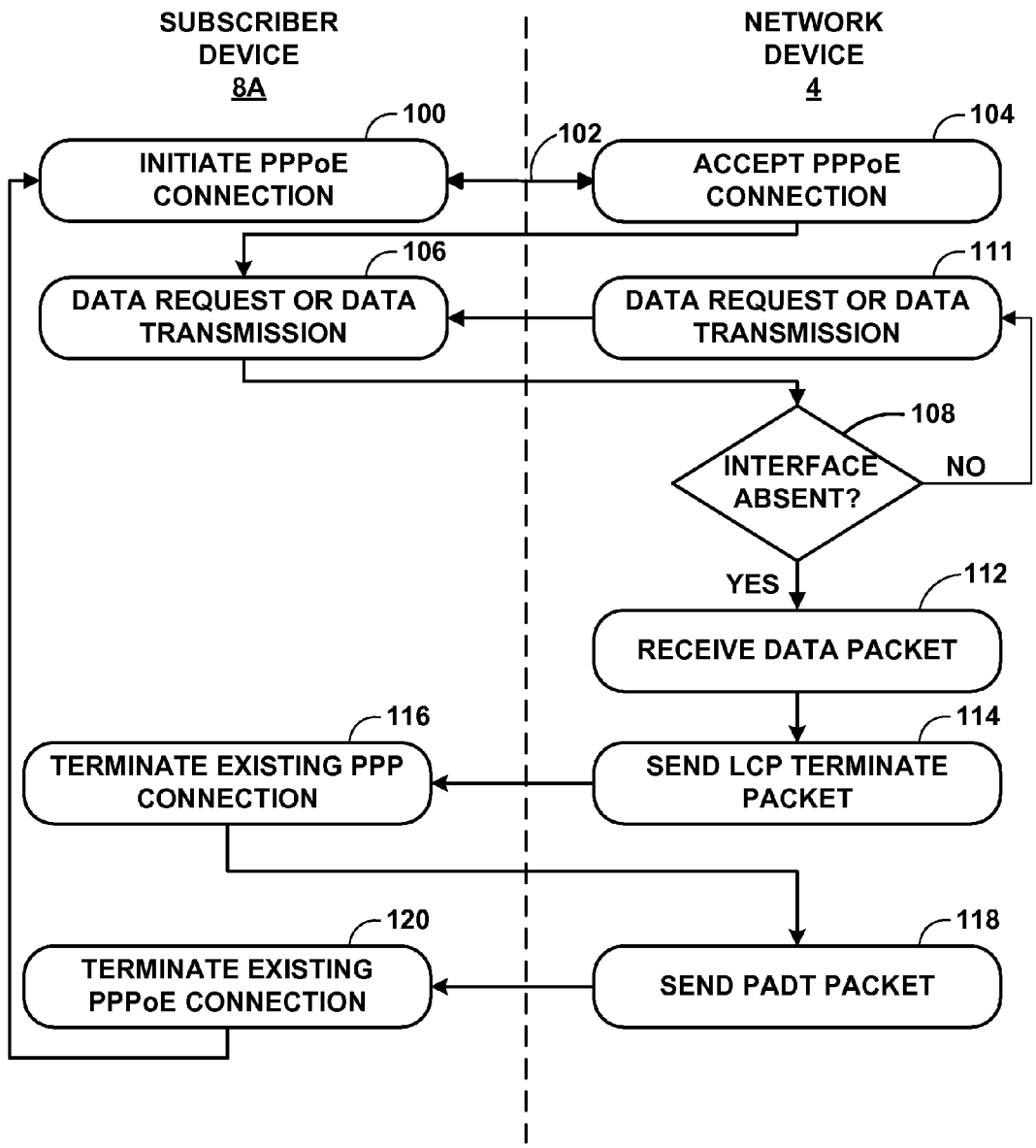
FIG. 9 is a flowchart illustrating exemplary operation in accordance with one embodiment of the techniques as applied to the Point-to-Point Protocol over Ethernet.

FIG. 9 is a flowchart illustrating exemplary operation in accordance with one embodiment of the technique as applied to the Point-to-Point Protocol over Ethernet (PPPoE). Initially, a subscriber device, for instance, subscriber device 8A, may initiate a PPPoE connection with network device 4 (100). This may be in response to a user request or any other request for data from a network. To establish a PPPoE connection, in accordance with the protocol, subscriber device 8A first transmits PPPoE Active Discovery Initiation (PADI) packet. The protocol describes a series of Active Discovery packets to be sent between the network access device (e.g., network device 4) and the subscriber device for initiation of a PPPoE session, which are depicted at (102). Once network device 4 has received a PADI packet, it transmits a PPPoE Active Discovery Offer (PADO) packet to the requesting subscriber device. Upon receiving a PADO packet, subscriber device 8A transmits a PPPoE Active Discovery Request (PADR) packet to network device 4.

Once network device 4 has received the PADR packet from subscriber device 8A, network device 4 will then send a PPPoE Active Discovery Session-confirmation (PADS) packet to confirm that the session has been established (104). Once the PPPoE session has been established, subscriber device 8A and network device 4 may then establish a PPP session over the PPPoE session in accordance with the PPP protocol.

After the PPP session has been established, subscriber device 8A may send or receive data from network device 4 over the PPPoE session in the form of PPP data packets (106).

As described above, auto-sensing component of Ethernet module 63, 64A-64N may detect an event leading to the interruption of communication due to the breakdown of the dynamic interface(s) that network device 4 built during initialization of the PPP session. In such a case, communicative at all layers, that is, layers above the lower L2 layer, are typically severed. As such, it may no longer be possible for data to be transmitted and received properly between corresponding entities at higher-layers. If subscriber device 8A has already discovered and corrected the error, the dynamic interface on the network device stack will have been rebuilt. If subscriber device 8A has not yet detected that the dynamic interface stack has been torn down, however, network device 4 may receive a PPP data packet from subscriber device 8A destined for the absent, subscriber-device specific PPP interface of the network device (112). At this point, the auto-sensing component may determine that subscriber device 8A has not yet discovered that communication has been interrupted due to the error. If subscriber device 8A had been aware of the error and broken dynamic interface stack, subscriber device 8A would have sent a PADI packet to re-initiate the PPPoE session, rather than a data packet.

In the case where an error has occurred, network device 4 may use Ethernet module 63, 64A-64N to proxy for the PPP and PPPoE layers. Network device 4 may first terminate the PPP session by sending an LCP termination packet to subscriber device 8A using a PPPoE proxy module of Ethernet module 63, 64A-64N (114). The PPPoE proxy module may encapsulate the LCP termination packet in a PPPoE session packet. The PPPoE proxy module may use information from the received data packet, such as the fixed session identifier, to create the LCP termination packet. Upon receiving the LCP termination packet, subscriber device 8A may terminate the PPP session and transmit a Termination-Acknowledged packet to network device 4 (116). Once network device 4 has received the Termination-Acknowledged packet from subscriber device 8A, the PPPoE proxy module may transmit a PPPoE Active Discovery Termination (PADT) packet to subscriber device 8A (96).

Upon receiving a PADT packet, subscriber device 8A will terminate the existing PPPoE connection (120). In accordance with the PPPoE protocol, subscriber device 8A should send no more PPPoE packets at this point. Once subscriber device 8A has terminated the existing dynamic interface, it may rebuild the dynamic interface according to the procedures described above with respect to (100). This cycle will continue until subscriber device 8A has finished collecting the data necessary for processing and terminates the connection naturally.

Various embodiments of the invention have been described. These and other embodiments are within the scope of the following claims.

The invention claimed is:

1. A network device to provide network access to a plurality of subscriber devices, the network device comprising:

a static lower layer two (L2) software interface that process communications from a lower L2 software interface of a subscriber device in accordance with a lower L2 network protocol; and a dynamic upper L2 software interface that processes communication from an upper L2 software interface of the subscriber device in accordance with an upper L2 network protocol, wherein, when the upper L2 software interface of the network device is terminated, a proxy software module of the lower L2 software interface of the network device operates on behalf of the upper L2 software interface of the network device and outputs a termination request in accordance with the upper L2 network protocol to reinitiate communications in accordance with the upper L2 network protocol, wherein the proxy software interface extracts identifying information from an upper L2 frame constructed by the upper L2 software interface of the subscriber device and forms the termination request based on the identifying information.

2. The network device of claim 1, wherein the lower L2 software interface sends the termination request packet to the upper L2 software interface of the subscriber device.

3. The network device of claim 1, wherein the identifying information comprises at least one of a source address, a destination address, a session identifier, a protocol identifier or a fixed identifier that corresponds to the subscriber device.

4. The network device of claim 1, wherein the proxy software interface outputs the termination request prior to rebuilding the dynamic upper L2 software interface.

5. A network device to provide network access to a plurality of subscriber devices, the network device comprising:

a static lower layer two (L2) software interface that process communications from a lower L2 software interface of a subscriber device in accordance with a lower L2 network protocol;

a dynamic upper L2 software interface that processes communication from an upper L2 software interface of the subscriber device in accordance with an upper L2 network protocol, wherein, when the upper L2 software interface of the network device is terminated, a proxy software module of the lower L2 software interface of the network device operates on behalf of the upper L2 software interface of the network device and outputs a termination request in accordance with the upper L2 network protocol to reinitiate communications in accordance with the upper L2 network protocol; and an auto-sensing component in the lower L2 software interface to detect when the upper L2 software interface of the network device has been terminated.

6. The network device of claim 5, wherein the auto-sensing component detects the termination of the upper L2 software interface of the network device in response to a restart of the network device, a line card reload, a down condition of an interface or hardware below the upper L2 software interface, or a communication link failure.

7. The network device of claim 5, wherein the auto-sensing component of the lower L2 software interface monitors communication from the subscriber device and detects when the subscriber device is unaware that the upper L2 software interface of the network device has been terminated.

8. The network device of claim 1, wherein the upper L2 software interface of the network device communicates with upper L2 software interfaces of a plurality of other network devices.

9. The network device of claim 1, wherein the lower L2 protocol comprises the Asynchronous Transfer Mode (ATM) protocol.

10. The network device of claim 9, wherein the static lower L2 interface comprises an ATM sub-interface.

11. The network device of claim 1, wherein the lower L2 protocol comprises the Ethernet protocol.

12. The network device of claim 1, wherein the upper L2 protocol comprises the Point-to-Point Protocol (PPP).

13. The network device of claim 1, wherein the upper L2 protocol comprises the PPP over Ethernet (PPPoE) protocol.

14. A method comprising:

receiving, with a network device, a network access request from a subscriber device;

establishing, within the network device, a lower layer two (L2) software interface that process communications in accordance with a lower L2 network protocol;

establishing, within the network device and in response to the network access request, a dynamic, subscriber-specific upper L2 software interface that processes communication from the subscriber device in accordance with an upper L2 network protocol;

terminating the upper L2 software interface of the network device in response to an event, wherein the event comprises a failure of a physical communication link, a restart of the network device, a restart of a line card or hardware interface of the network device, or a failure condition of hardware or software below the upper L2 software interface; and when the upper L2 software interface of the network device is terminated, outputting a termination request from the lower L2 software interface in accordance with the upper L2 network protocol to reinitiate communications with the subscriber device in accordance with the upper L2 network protocol.

15. A method comprising:

receiving, with a network device, a network access request from a subscriber device;

establishing, within the network device, a lower layer two (L2) software interface that process communications in accordance with a lower L2 network protocol;

establishing, within the network device and in response to the network access request, a dynamic, subscriber-specific upper L2 software interface that processes communication from the subscriber device in accordance with an upper L2 network protocol;

terminating the upper L2 software interface of the network device in response to an event; and when the upper L2 software interface of the network device is terminated, outputting a termination request from the lower L2 software interface in accordance with the upper L2 network protocol to reinitiate communications with the subscriber device in accordance with the upper L2 network protocol, wherein outputting a termination request comprises:

detecting, with the lower L2 software interface, receipt of a communication from the subscriber device in accordance with the upper L2 network protocol after termination of the upper L2 software interface on the network device; and outputting the termination request in response to the detection.

16. A method comprising:

receiving, with a network device, a network access request from a subscriber device;

establishing, within the network device, a lower layer two (L2) software interface that process communications in accordance with a lower L2 network protocol;

establishing, within the network device and in response to the network access request, a dynamic, subscriber-specific upper L2 software interface that processes communication from the subscriber device in accordance with an upper L2 network protocol;

terminating the upper L2 software interface of the network device in response to an event; and when the upper L2 software interface of the network device is terminated, outputting a termination request from the lower L2 software interface in accordance with the upper L2 network protocol to reinitiate communications with the subscriber device in accordance with the upper L2 network protocol, wherein outputting a termination request comprises:

receiving an upper L2 communication at the first network device from the subscriber device;

creating a termination request packet with the lower L2 software interface of the first network device in accordance with the upper L2 protocol on behalf of the terminated upper L2 software interface of the network device; and sending the termination request packet from the lower L2 software interface of the network device to the subscriber device.

17. The method of claim 16, further comprising:

extracting subscriber-specific identifying information from the upper L2 communication with the lower L2 software interface; and creating the termination request packet to the identifying information.

18. The method of claim 17, wherein extracting identifying information comprises extracting at least one of a source address, a destination address, a session identifier, a protocol identifier, or a subscriber-specific fixed identifier.

19. The method of claim 14, wherein outputting the termination request comprises outputting the termination request packet prior to rebuilding a dynamic interface stack within the network device to reestablish the upper L2 software interface.

20. The method of claim 14, wherein the lower L2 network protocol comprises at least one of the Asynchronous Transfer Mode (ATM) protocol and the Ethernet protocol.

21. The method of claim 14, wherein the upper L2 network protocol comprises at least one of the Point-to-Point Protocol (PPP) and the PPP over Ethernet (PPPoE) protocol.

22. A computer-readable storage medium comprising instructions causing a processor to:

receive, with a network device, a network access request from a subscriber device;

establish, within the network device, a lower layer two (L2) software interface that process communications in accordance with a lower L2 network protocol;

establish, within the network device and in response to the network access request, a dynamic, subscriber-specific upper L2 software interface that processes communication from the subscriber device in accordance with an upper L2 network protocol;

terminate the upper L2 software interface of the network device in response to an event, wherein the event comprises a failure of a physical communication link, a restart of the network device, a restart of a line card or hardware interface of the network device, or a failure condition of hardware or software below the upper L2 software interface; and when the upper L2 software interface of the network device is terminated, output a termination request from the lower L2 software interface in accordance with the upper L2 network protocol to reinitiate communications with the subscriber device in accordance with the upper L2 network protocol.

23. A network system comprising:

a subscriber device; and a network device to provide network access to a plurality of subscriber devices, wherein the network device comprises:

a static lower layer two (L2) software interface that process communications from a lower L2 software interface of the subscriber device in accordance with a lower L2 network protocol; and a dynamic upper L2 software interface that processes communication from an upper L2 software interface of the subscriber device in accordance with an upper L2 network protocol, and a proxy software module of the lower L2 software interface that detects when the subscriber device is unaware that the upper L2 software interface of the network device has terminated and, in response, outputs a termination request in accordance with the upper L2 network protocol to reinitiate communications in accordance with the upper L2 network protocol.

24. The network system of claim 23, wherein the subscriber device does not support a keepalive function to detect when the upper L2 software interface of the network device has terminated.

* * * * *

UNITED STATES PATENT AND TRADEMARK OFFICE
CERTIFICATE OF CORRECTION

PATENT NO. : 7,813,376 B1  
APPLICATION NO. : 11/760446  
DATED : October 12, 2010  
INVENTOR(S) : Gibbons et al.

Page 1 of 1

It is certified that error appears in the above-identified patent and that said Letters Patent is hereby corrected as shown below:

Column 15, line 1, claim 1, "process" should read -- processes --

Column 15, line 34, claim 5, "process" should read -- processes --

Column 16, line 17, claim 14, "process" should read -- processes --

Column 17, line 2, claim 16, "process" should read -- processes --

Column 18, line 4, claim 22, "process" should read -- processes --

Column 18, line 30, claim 23, "process" should read -- processes --

Signed and Sealed this
Seventeenth Day of April, 2012

David J. Kappos
*Director of the United States Patent and Trademark Office*